United States Patent [19]

Gömöri

[11] 4,213,403
[45] Jul. 22, 1980

[54] INCINERATION PLANT

[75] Inventor: Jamos Gömöri, Zurich, Switzerland

[73] Assignee: Sulzer Brothers Limited, Winterthur, Switzerland

[21] Appl. No.: 908,110

[22] Filed: May 22, 1978

[30] Foreign Application Priority Data

Mar. 7, 1978 [CH] Switzerland .......................... 2441/78

[51] Int. Cl.² .............................................. F23G 7/00
[52] U.S. Cl. ..................................... 110/216; 110/214
[58] Field of Search ................ 165/170; 110/210, 211, 110/212, 213, 214, 119, 216

[56] References Cited

U.S. PATENT DOCUMENTS

| | | | |
|---|---|---|---|
| 615,400 | 12/1898 | Meldrum et al. | 110/210 |
| 830,974 | 9/1906 | Decarie | 110/210 |
| 2,952,226 | 9/1960 | Sherman | 110/214 |
| 3,215,501 | 11/1965 | Phillips | 110/213 |
| 3,259,083 | 7/1966 | Evans | 110/210 |
| 3,543,700 | 12/1970 | Baigas, Jr. et al. | 110/213 |
| 3,808,619 | 5/1974 | Vanderveer | 110/213 |
| 3,871,624 | 3/1975 | Huber et al. | 165/170 |

Primary Examiner—Edward G. Favors
Attorney, Agent, or Firm—Kenyon & Kenyon

[57] ABSTRACT

The incineration plant is provided with at least one static mixer which is disposed in the combustion gas duct leading from the furnace to a gas purifier. The static mixer is constructed in various forms, each of which includes a plurality of guide elements for dividing the gas flow into a plurality of sub-flows and for passing the sub-flows through the mixer in a criss-crossing relation. The static mixer effects a homogeneous temperature distribution in the gas as well as a homogeneous concentration distribution of any dust in the gas prior to passage of the gas to the gas purifier.

8 Claims, 5 Drawing Figures

INCINERATION PLANT

This invention relates to an incineration plant. More particularly, this invention relates to a refuse incineration plant.

Heretofore, various types of incineration plants have been known in which solid fuels, such as refuse or coal, or liquid fuels, such as oil or gases, are burnt and generate hot dust-containing combustion gases of a temperature of, for example 800° C. to 1000° C. Generally, these hot gases flow through or over a boiler or heat exchanger to yield heat to a working medium in tubes of the boiler or heat transfers surfaces of the heat exchanger before being exhausted. These combustion gases usually have considerable temperature differences at the boiler outlet.

It has also been known that local condensation occurs as soon as the temperature in places falls below the dew-point within the flow of combustion gas. Since sulphur is usually deposited at this time, this gives rise to corrosion in the plant.

It is also known that refuse incineration plants use gas purifiers for example electrostatic precipitators, smoke gas scrubbers or reactors containing a catalyst, in order to remove dust and the like from the gases which are to be exhausted from the plant. Also, in some cases, it has been proposed to supply cold air to the combination gases which have not been sufficiently cooled in the boiler before the gases enter the gas purifier. However, in order to avoid high temperature corrosion in the units, particularly an electrostatic precipitator, situated downstream of a boiler, the supply of cold air may well require a longer running time for the overall plant. Further, it has not been possible to satisfactorily mix the combustion gases with the cold air. Instead, streaks of cold air and/or hot gases have been formed in the gas flow.

In order to compensate for the inhomogeneity in the gas flow, use has been made of perforated plates or baffles in the combustion duct between the boiler and gas purifier. However, it has been found in practice that this has been unable to provide adequate mixing of the combustion gases with the cold air. As a result, streaking is inevitable so that the total plant running time is relatively short. The term "running time" as used in this context denotes the time between the starting up and shutting down of the plant, for example for overhaul purposes. Further, the use of perforated plates or baffles results in high pressure losses because the plates or baffles are rapidly clogged due to deposits from the dust which is entrained in the combustion gases.

Accordingly, it is an object of the invention to effect a homogeneous temperature distribution in a flow of combustion gas from a furnace of an incineration plant and a homogeneous concentration distribution of the dust or like constituents in the combustion gas.

It is another object of the invention to provide a relatively simple structure for achieving a homogeneous temperature distribution of combustion gases passing from a furnace to a gas purifier.

It is another object of the invention to avoid streaking in a flow of combustion gas mixed with a supply of cold air.

It is another object of the invention to obtain a relatively long running time for an incineration plant in which cold air is supplied to a flow of hot combustion gas leading to a gas purifier.

Briefly, the invention provides an incineration plant having a combustion gas duct for exhausting a flow of hot dust-containing combustion gas and a gas purifier for removing dust from the flow of combustion gas with at least one static mixer disposed in the duct to mix the flow of gas passing therethrough to effect a homogeneous temperature distribution in the gas and a homogeneous concentration distribution of the dust in the gas. The static mixer includes a plurality of guide elements for dividing the gas flow into a plurality of sub-flows and for passing the sub-flows through the mixer in criss-crossing relation to each other.

The static mixer may be constructed in any suitable manner. For example, the mixer may include a plurality of corrugated lamellae which are disposed in parallel contacting relation with each other and with the corrugations disposed in angular relation to the duct and in criss-crossing relation to the corrugations of an adjacent lamallae.

In another embodiment, the static mixer may include a plurality of flat surface plates disposed in parallel spaced apart relation coaxial of the duct and a plurality of parallel spaced apart flat elements on opposite sides of each plate. These flat elements are disposed in angular relation to the duct and in criss-crossing contacting relation to the flat elements on an adjacent plate.

In still another embodiment, the static mixer includes a plurality of parallel continuous layers of tubes. In this case, each layer has tubes disposed in angular relation to the duct and in criss-crossing relation to the tubes of an adjacent layer. In addition, each tube has at least one aperture in a side wall to permit communication between the interiors of adjacent tubes.

In still another embodimemt, the static mixer may include a plurality of layers of strip elements. In this case, the strip elements of alternating layers disposed are in edgewise relation to each other as well as in contacting criss-crossing relation. Further, where the duct for the combustion gas flow has a circular cross-section, each layer of this static mixer has an eliptical configuration in order to fit within the duct. In addition, each layer is inclined relative to each other and to the duct.

During operation, the static mixers effect only a slight pressure drop in the gas flow while insuring excellent homogenization of the temperature and the concentration distribution of the dust in the combustion gas. Because of the homogenization of the temperature, the combustion gas temperature is above the dew point when the combustion gas enters the gas purifier.

It has been unexpectedly found that the above static mixers do not clog during operation as was originally assumed. Practice has shown that dust deposits forming at the suction-generating entry edges of the static mixers are repeatedly blown away.

These and other objects and advantages will become more apparent from the following detailed description taken in conjunction with the accompanying drawing in which.

Figure 1:
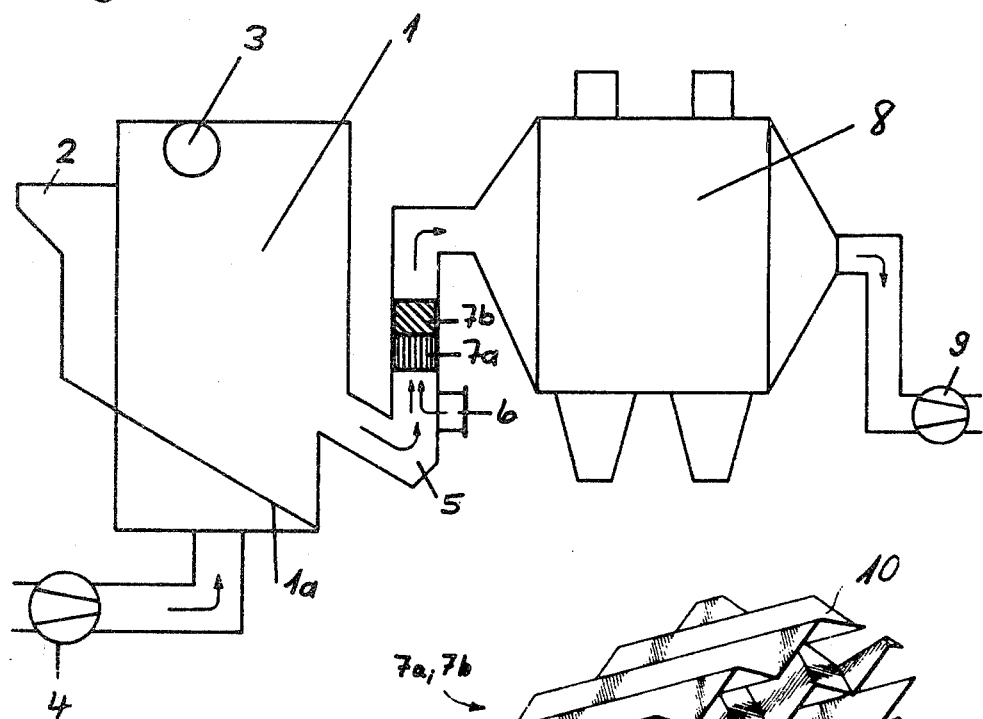
FIG. 1 illustrates a schematic view of a refuse incineration plant having a static mixer in accordance with the invention.

Referring to FIG. 1, the incineration plant employs a furnace 1 for burning a fuel while generating a flow of dust-containing combustion gas. A suitable fuel feed hopper 2 is connected to the furnace 1 in order to supply the fuel, for example refuse. In addition, a boiler drum 3 is disposed within the furnace 1, for example in an upper part and contains, for example boiler tubes for conveying a working medium which can be heated via a heat exchange with the hot combustion gases generated within the furnace 1. In addition, the furnace 1 has a grate 1a near the bottom and a blower 4 is connected to the furnace 1 in order to supply air to the furnace 1 at a point beneath the grate 1a.

A combustion gas duct 5 communicates with the furnace 1 in order to exhaust the dust-containing combustion gases which are produced in the furnace 1. In addition, an air supply inlet 6 is formed in the duct 5 for introducing cold air, for example ambient air, into the flow of combustion gas. If no cold air is required, the air supply inlet 6 is closed.

Figure 2:
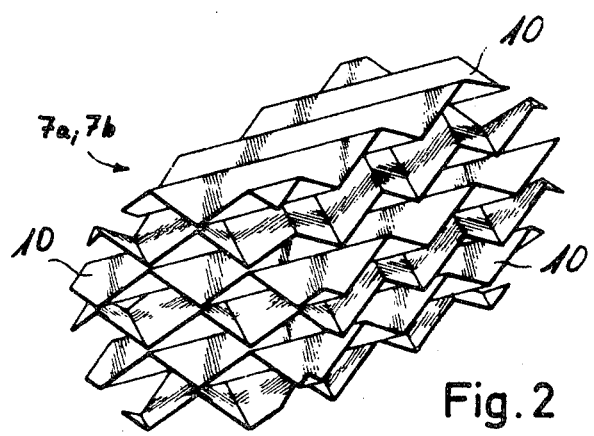
FIG. 2 illustrates a perspective view of one embodiment of a static mixer utilized in accordance with the invention.

In addition, at least one static mixer consisting of two units 7a, 7b is disposed in the duct 5 downstream of the cold air supply 6. Each unit, 7a, 7b includes a plurality of guide elements or means such as corrugated lamellae 10 for dividing the gas flow into a plurality of sub-flows and for passing the sub-flows through the unit 7a, 7b in criss-crossing relation to each other. As illustrated in FIG. 2, the corrugated lamellae 10 are disposed in parallel contacting relation and each has corrugations which are disposed in angular relation to the duct 5 to form flow passages for the combustion gas as well as in criss-crossing relation to the corrugations of an adjacent lamellae 10. As indicated, the corrugated lamellae 10 touch one another along the corrugations at least at the point of intersection. As indicated in FIG. 1, the unit 7a, 7b are disposed one after the other and are offset by an angle of 90° to one another.

The incineration plant also has a gas purifier 8 which communicates with the duct 5 downstream of the static mixer 7a, 7b for removing the dust from the flow of combustion gas in known manner. In addition, a suction flue fan 9 is disposed in communication with the gas purifier 8 in order to exhaust purified exhaust gases to a chimney (not shown).

During operation of the plant, a dust-containing combustion gas is produced in the furnace 1 and passed over the tubes (not shown) of the boiler 3 and thereafter exhausted into the duct 5. The dust-containing combustion gas is then mixed with cold air which is introduced via the inlet 6 and directed into the static mixer 7a, 7b. The gas mixture which consists of the hot combustion gases and cold air is then broken up into individual sub-flows in the flow passages of the mixer units 7a, 7b. These sub-flows are then displaced in relation to one another to compensate for any inhomogenity of temperature or concentration distribution of the dust within the gas flow. Thereafter, the gas mixture passes to the electrostatic precipitator 8 with a uniform temperature over the entire entry cross-section of the gas. This prevents damage to the electrostatic precipitator 8 since the precipitator is no longer subjected to sub-flows at relatively high temperature.

After purification in the precipitator 8, the purified exhaust gases are delivered from the precipitator 8 to the chimney (not shown) via the suction flue fan 9.

Figure 3:
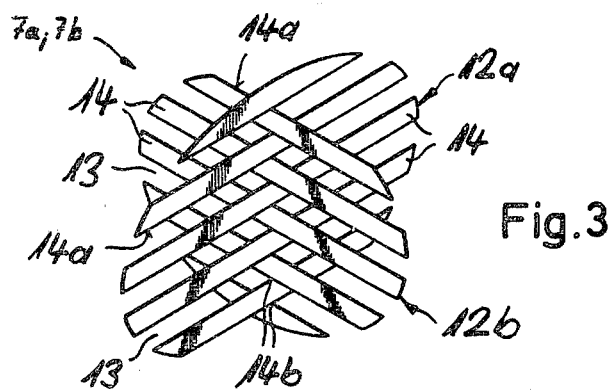
FIG. 3 illustrates a further embodiment of a static mixer utilized in accordance with the invention.

Alternatively, as shown in FIG. 3, each unit 7a, 7b of the static mixer may be constructed in different fashion. For example, the static mixer may have a pair of layers 12a, 12b which are composed of sheet metal strip elements 14 disposed in spaced apart relation to define flow ducts 13. The strip elements 14 of alternating layers are disposed in edgewise relation to each other and in contacting criss-crossing relation. As shown, the two adjacent layers 12a, 12b touch one another at the contact points 14b of the edges 14a, for example, where the layers are welded together. When this static mixer is used in a circular cylindrical duct, the layers 12a, 12b have an eliptical configuration so as to fit within the duct. In addition, each layer 12a, 12b is inclined relative to the other and to the duct.

Figure 4:
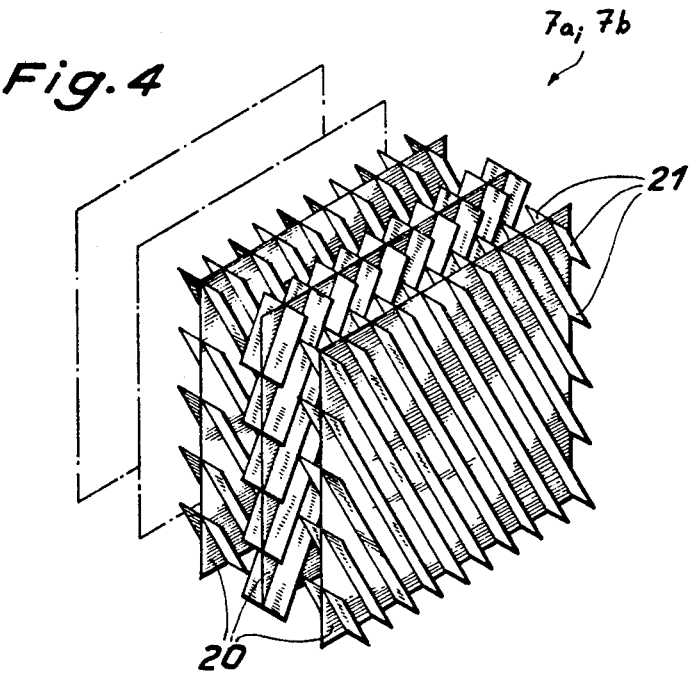
FIG. 4 illustrates a perspective view of part of another static mixer utilized in accordance with the invention.

Referring to FIG. 4, the static mixer units 7a, 7b may alternatively be constructed of a plurality of flat surface plates 20 and parallel spaced apart flat elements 21. As shown, the surface plates 20 are disposed in parallel spaced apart relation and are intended to be positioned coaxially of the duct 5 (FIG. 1). The flat elements 21 are positioned in parallel spaced apart relation on opposite sides of each plate 20, in angular relation to the duct 5 (FIG. 1) and in criss-crossing contacting relation to the flat elements 21 on an adjacent plate 20. Individual flow ducts are defined by the flat surface plates 20 and by each two adjacent flat elements 21. The surface plates 20 may be formed of sheet metal while the guide elements 21 may be, for example of sheet metal. Such sheet metal flat elements 21 may be secured, for example at an angle of 90°, to the surface plate 20 by welding or soldering. As shown, the elements 21 contact each other at the points of intersection.

Figure 5:
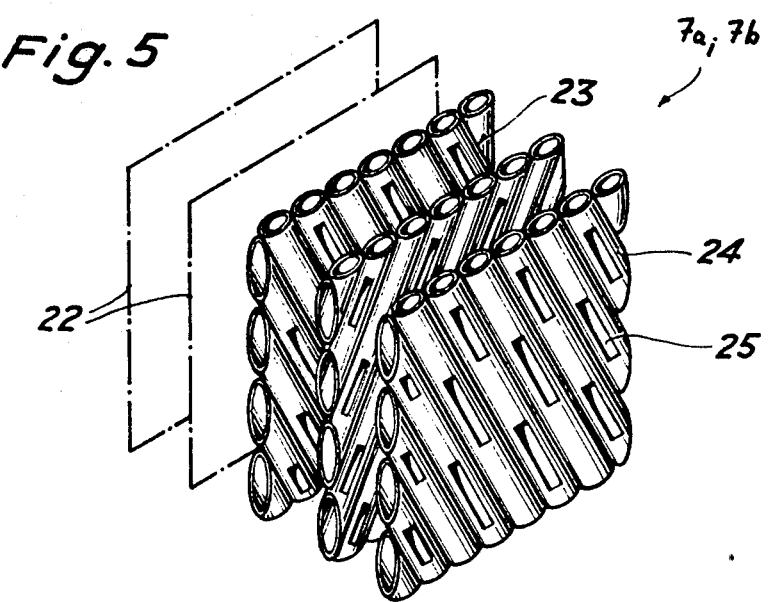
FIG. 5 illustrates a view of a part of a further static mixer utilized in accordance with the invention.

Referring to FIG. 5, each mixer unit 7a, 7b may also be formed of a plurality of parallel contiguous layers 23 of tubes 24. As shown, each layer 23 has tubes 24 which are disposed in adjacent fixed relationship to one another. The tubes 24 contact each other in the longitudinal direction and are each disposed in angular relation to the duct (not shown) as well as to the longitudinal axis of the layers 23. The tubes 24 of adjacent layers are disposed in criss-crossing contacting relation to each other and each tube 24 has apertures 25 in a sidewall in order to permit communication between the interiors of the adjacent tubes 24. As in the above embodiments in which the corrugated lamellae or the flat elements of adjacent layers touch one another at the point of intersection, the tube axes of adjacent layers include an angle with one another and the tubes 24 form flow ducts with communicate with another via the apertures 25.

It is to be noted that static mixers of the above described types have been known per se for various uses than as described above for example as described in U.S. Pat. Nos. 3,785,620 and 3,871,624.

What is claimed is:

1. An incineration plant comprising
   a furnace for burning a fuel while generating a flow of dust-containing combustion gases;
   a combustion gas duct communicating with said furnace to exhaust the dust-containing combustion gases from said furnace;
   at least one static mixer disposed in said duct to mix a flow of combustion gas passing therethrough to effect a homogeneous temperature distribution in the gas and a homogeneous concentration distribution of the dust in the gas, said static mixer including a plurality of guide means for dividing the gas flow into a plurality of sub-flows and for passing the sub-flows through said mixer in criss-crossing relation to each other; and a gas purifier communicating with said duct downstream of said static mixer for removing the dust from the flow of combustion gas.

2. An incineration plant as set forth in claim 1 which further comprises an air supply inlet in said duct upstream of said static mixer for introducing cold air into the flow of combustion gas.

3. An incineration plant as set forth in claim 1 wherein said guide elements include a plurality of corrugated lamellae disposed in parallel contacting relation with each lamellae having corrugations disposed in angular relation to said duct and in criss-crossing relation to the corrugations on an adjacent lamellae.

4. An incineration plant as set forth in claim 1 wherein said guide elements include a plurality of flat surface plates disposed in parallel spaced apart relation coaxial of said duct and a plurality of parallel spaced apart flat elements on opposite sides of each plate, said flat elements being disposed in angular relation to said duct and in criss-crossing contacting relation to flat elements on an adjacent plate.

5. An incineration plant as set forth in claim 1 wherein said guide elements include a plurality of parallel contiguous layers of tubes, each layer having said tubes thereof disposed in angular relation to said duct in criss-crossing contacting relation to said tubes of an adjacent layer, each said tube having at least one aperture in a side wall to permit communication between the interiors of adjacent tubes.

6. An incineration plant as set forth in claim 1 wherein said guide elements include a plurality of layers of strip elements with strip elements of alternating layers disposed in edgewise relation to each other and in contacting criss-crossing relation.

7. An incineration plant as set forth in claim 6 wherein said duct has a circular cross-section and each layer has elliptical configuration to fit within said duct and wherein each layer is inclined relative to each other and to said duct.

8. In combination with an incineration plant having a combustion gas duct for exhausting a flow of hot dust-containing combustion gas and a gas purifier in communication with said duct for removing dust from the flow of combustion gas; at least one static mixer disposed in said duct to mix the flow of gas passing therethrough to effect a homogeneous temperature distribution in the gas and a homogeneous concentration distribution of the dust in the gas prior to passage into said gas purifier, said static mixer including a plurality of guide means for dividing the gas flow into a plurality of sub-flows and for passing the sub-flows through said mixer in criss-crossing relation to each other.

* * * * *

UNITED STATES PATENT AND TRADEMARK OFFICE
CERTIFICATE OF CORRECTION

PATENT NO. : 4,213,403
DATED : July 22, 1980
INVENTOR(S) : Janos Gōmōri

It is certified that error appears in the above—identified patent and that said Letters Patent is hereby corrected as shown below:

Column 1, line 28, change "combination" to -- combustion --.

Column 2, line 35, change "embodimemt" to -- embodiment --.

In the front page, Item [75], change "Jamos" to -- Janos --.

In the front page, under Item [30], add -- May 20, 1977 [CH] Switzerland 6282/77 --.

Signed and Sealed this

Eleventh Day of November 1980

[SEAL]

Attest:

SIDNEY A. DIAMOND

Attesting Officer

Commissioner of Patents and Trademarks